United States Patent

[11] 3,617,517

| [72] | Inventor | Jay A. Rashkin<br>Piscataway, N.J. |
|---|---|---|
| [21] | Appl. No. | 835,794 |
| [22] | Filed | June 23, 1969 |
| [45] | Patented | Nov. 2, 1971 |
| [73] | Assignee | Cities Service Oil Company<br>Tulsa, Okla. |

[54] HYDROFORMING CATALYST
9 Claims, No Drawings

[52] U.S. Cl. .................................................. 208/136,
252/462, 252/465, 252/466 J
[51] Int. Cl. ........................................................ C10g 35/06
[50] Field of Search............................................ 252/462,
465; 208/136

[56] References Cited
UNITED STATES PATENTS

| 3,205,165 | 9/1965 | Hilfman | 208/254 |
| 2,897,135 | 7/1959 | Doumani | 208/112 |
| 3,242,101 | 3/1966 | Erickson | 252/465 |
| 2,498,709 | 2/1950 | Roberts | 252/465 |
| 2,846,363 | 8/1958 | Folkins | 196/50 |
| 2,405,184 | 8/1946 | Burk | 260/668 |
| 2,800,461 | 7/1957 | Krarby | 252/417 |
| 2,424,637 | 7/1947 | Smith | 260/668 |
| 3,132,111 | 5/1964 | Erickson | 252/464 |

*Primary Examiner*—Daniel E. Wyman
*Assistant Examiner*—Philip M. French
*Attorney*—J. Richard Geaman

ABSTRACT: A hydroforming catalyst comprising oxides of copper, nickel and molybdenum and a process for hydroforming hydrocarbon oils using such catalysts. The catalyst may also contain oxides of thorium or zirconium and is on a gamma alumina base.

HYDROFORMING CATALYST

This invention relates to novel catalysts for use in hydroforming hydrocarbon oils as well as to a process for hydroforming such oils using such catalysts.

The term "hydroforming" as used herein refers to processes of the type wherein a hydrocarbon fraction is subjected to treatment at high temperature and superatmospheric pressure in the presence of hydrogen gas and a suitable catalyst to provide a highly aromatic or otherwise chemically reconstructed product. The feed stock to the hydroforming process is preferably a hydrocarbon fraction boiling in the gasoline range, e.g., between about 185° and about 450° F. and the product generally has a higher octane number than the feed stock. The term "hydroforming" denotes something more than mere desulfurization or purification of the hydrocarbon fraction. Among the hydrocarbon conversion reactions which may occur to a greater or lesser extent during the hydroforming process are dehydrogenation of napthenes to aromatics, hydrocracking of higher boiling paraffins, isomerization of paraffins to products having a greater degree of chain branching, cyclization and desulfurization. Various metals and oxides and sulfides thereof have been suggested as suitable catalysts for the hydroforming reaction and these catalysts are frequently used on a suitable support material such as alumina.

It has now been found that mixtures of copper oxide, nickel oxide and molybdenum oxide, on an alumina support, made unexpectedly superior hydroforming catalysts. It has also been found that the effectiveness of such catalysts may further be increased by the addition of minor amounts of thorium oxide or zirconium oxide.

The present invention is predicated on the discovery that the novel catalysts mentioned above function as highly effective hydroforming catalysts. More particularly, these catalysts have high activity, excellent stability and the ability to produce exceptionally outstanding yields of liquid hydrocarbon product containing at least six carbon atoms ($C_6$+hydrocarbons) when reforming to a given octane level. Accordingly, the catalyst used in the process of the present invention provides substantial economies by enabling the hydrocarbon feed stock to be hydroformed to a higher octane number at a given feed rate or at a higher feed rate to a given octane number.

The catalyst compositions contemplated by the present invention may be formed by a variety of methods. One suitable method, for example, involves impregnating a particulate absorbent alumina gel, preferably gamma alumina, with solutions of salts of the various desired metals and subsequently drying and calcining the resulting catalyst. Catalysts of the present invention may be prepared for instance by impregnating a gamma alumina base with solutions of nitrates of the various desired metals. The resulting catalyst may then be dried and calcined at temperatures of, for instance, between about 1,100° and about 1,500° F. for a period between about 1 ½ and about 4 hours in an oxidizing atmosphere such as air. The catalyst compositions may also be prepared by coprecipitation of the various components followed by drying and calcining.

As mentioned above, catalysts of the present invention are supported on an alumina base. Gamma alumina is preferred because of its high surface area and good catalytic properties. Unfortunately, gamma alumina on aging tends to transform to the alpha alumina form which is generally considered to be catalytically inactive and does not have as much surface area as an equivalent amount of gamma alumina. It is believed that the beneficial results obtained in hydroforming operations using catalysts of the present invention are due to at lease in part to the effect of these particular combinations of catalytic metals in inhibiting sublimation of metal oxides from the catalyst and transformation of alumina from the gamma to the alpha form.

While the catalyst support preferred in accordance with the invention is gamma alumina, it is sometimes considered desirable to add small amounts of silica such as between about 0.5 and about 5.0 wt. percent based upon total catalyst to the alumina in order to further stabilize the alumina.

Particularly preferred catalysts of the present invention are those containing 0.5 to about 10.0 wt. percent copper, between about 5 and about 15 wt. percent molybdenum, and between about 0.5 and about 5.0 wt. percent based on the total catalyst with the balance of the catalyst, usually between about 75 and about 95 wt. percent thereof, being gamma alumina. Thorium or zirconium oxide or a mixture thereof may also be present and, if used, is preferably used in amounts between about 0.5 and about 5.0 wt. percent based upon the total weight of catalyst.

The catalyst of the present invention have been found to have significantly higher activity compared to standard alumina supported molybdenum oxide hydroforming catalyst. As used herein, the term "catalyst activity" is defined as the ratio of feed stock space velocity (weight of feed per hour per weight of catalyst) enabled by the catalyst of the present invention to the space velocity enabled by a standard 11 wt. percent molybdenum oxide on alumina catalyst at a constant hydroforming temperature and product octane level. The higher activity catalyst utilized in the present hydroforming process enable significantly higher feed stock throughputs when hydroforming to a given octane number.

Catalysts of the present invention have also been found to be extremely effective in increasing the yield of desirable $C_6$+ liquids, i.e., liquid hydrocarbons having at least six carbon atoms, while decreasing the yield of undesirable coke products and light ends and gases.

While the catalysts of the present invention have been described above as comprising mixtures of oxides of copper, nickel and molybdenum an an alumina base with the possibility of oxides of thorium and zirconium also being present for further improvement, it should be understood that these metals may to some extent be present as metals and sulfides. Calcining of the catalyst during its preparation usually oxidizes all of the metals present to the highest oxidation states. However, during use of the catalyst in a hydrogen atmosphere, some of the metal content of the catalyst may be reduced to lower oxidation states or to metal.

In practicing the hydroforming process of the present invention, a hydrocarbon fraction is contacted with the copper oxide, nickel oxide and molybdenum oxide on alumina catalyst in the presence of from about 500 to about 8,000 standard cubic feet of hydrogen per barrel of hydrocarbon feed at a temperature from about 700° F. to about 1,000° F., preferably between about 800° F. and about 950° F., and at a pressure of from about 50 to about 1,000 p.s.i.g., preferably 100 to 500 p.s.i.g. The space velocity at which the content is effected may advantageously vary from about 0.20 to about 2.0 weight of liquid feed per hour per weight of catalyst (w./hr./w.) although space velocities within the range of 0.3 to 1.3 w/hr/w/ are most preferred. The catalyst is preferably maintained in a fluidized state during contacting with the liquid hydrocarbon feed. For this purpose, the catalyst is preferably employed in the form of microspheres having diameters of from about 20 to about 100 microns.

Regeneration of the catalyst composition may be accomplished conveniently by combusting carbonaceous contaminants deposited thereon as a result of the hydroforming process. In accordance with one suitable regeneration procedure, w./hr./w. spent catalyst is contacted with air at a temperature of 1,000° F. to 1,300° F., e.g., 1,125° F. Since sublimation of metal oxides, especially molybdenum oxide, from the catalyst and transformation of gamma alumina into alpha alumina usually take place at accelerated rates during regeneration, the improved stability of catalysts of the present invention in these respects, especially if thorium or zirconium oxides are present, is especially evident when the catalyst must be regenerated a number of times. Such catalysts are superior in their ability to retain their activity over a long period of use involving a number of regeneration cycles.

The preferred hydrocarbon feed stock employed in the hydroforming process of the invention is a hydrocarbon fraction boiling in the gasoline range, i.e., between about 185° F. and about 450° F. For instance, the feed stock may be thermally or catalytically cracked naphtha, virgin naphtha, coker naphtha, Fischer-Tropsch naphtha or mixtures thereof with virgin naphtha being preferred. The present process is also useful, however, in dehydrogenation of dicyclic naphthene feeds boiling within the range of 400° to 500° F. such as kerosene to produce dicyclic aromatic hydrocarbons.

In addition to the advantages previously noted, the catalyst utilized in the present invention enables the hydroforming process to be carried on at relatively low pressures without significant increase in coke formation. The use of lower operating pressures, e.g., 100 to 300 p.s.i.g. results in further increases in the yield of desired $C_6$+liquid hydrocarbons.

The following catalysts may be cited as typical examples of catalysts suitable for use in hydroforming processes in accordance with the present invention. The catalysts in table I are listed in terms of weight percent of the various metals present, but it should be understood that the metals are actually present in the form of metal oxides.

TABLE I

SUITABLE CATALYSTS

| Catalyst No. | Cu | Ni | Mo | Th | Zr | Al |
|---|---|---|---|---|---|---|
| 1 | 2.5 | 2.5 | 7.5 | — | — | 87.5 |
| 2 | — | — | 7.5 | 5 | — | 87.5 |
| 3 | — | — | 7.5 | — | 5 | 87.5 |
| 4 | 5 | 5 | 15 | — | — | 75 |
| 5 | 0.5 | 0.5 | 5 | — | — | 94 |
| 6 | 1 | 0.5 | 10 | 1 | 0.5 | 87 |
| 7 | 2 | 1 | 6 | — | 1 | 90 |
| 8 | 4 | 3 | 5 | 4 | — | 84 |
| 9 | 2 | 2 | 12 | 2 | 2 | 80 |
| 10 | 10 | 3 | 7 | — | 3 | 77 |

To illustrate the advantages of catalysts of the present invention in hydroforming of hydrocarbon feed stocks as well as the synergistic effect of the combination of copper oxide, nickel oxide and molybdenum oxide for this purpose, a number of pilot plant equipment. In each of these runs, a virgin naphtha feed stock having the inspection set forth in table II below was hudroformed by conventional fluid bed techniques at a temperature of 870° F. (except for runs 6 and 7 which were operated at about 900° F. ), pressures of between 200 and 270 p.s.i.g. and a space velocity of 0.7 w./hr./w. in the presence of 2,500 standard cubic feet of hydrogen per barrel of liquid feed.

TABLE II

FEEDSTOCK INSPECTION

| °API gravity | | | 54.1 |
|---|---|---|---|
| ASTM distillation | | | |
| IBP | | °F. | 218 |
| 10% | | °F. | 244 |
| 20% | | °F. | 250 |
| 30% | | °F. | 258 |
| 40% | | °F. | 264 |
| 50% | | °F. | 271 |
| 60% | | °F. | 278 |
| 70% | | °F. | 288 |
| 80% | | °F. | 298 |
| 90% | | °F. | 315 |
| End point | | °F. | 370 |
| Recovery | percent | | 98.0 |
| Residue | do | | 1.0 |
| Dry point | | | 332 |
| K factor | | | 11.80 |

Table III shows the weight percent (based on total catalyst including base) copper, nickel, molybdenum, thorium and zirconium in the catalysts used for the various runs reported. The metals were all in the form of metal oxides with the molybdenum being in the preferred form of $MoO_3$. All of the catalysts were supported on the same gamma alumina base and were calcined in air for 2 hours at a temperature of 1,300° before use.

The $C_6$+ selectivity of each of the catalysts was determined at constant octane level by the equation:

$C_6$+ selectivity equals $C_6$+ volume percent yield from catalyst being tested minus $C_6$+ volume percent yield from standard 11 percent $MoO_3$ catalyst.

Table III also reports the results of these experiments in terms of the activity, $C_6$+ selectivity and percent methane yield for each of the catalysts tested as well as the standard 11 percent $MoO_3$ catalyst.

TABLE III

CATALYST COMPOSITION AND RESULTS

| | Run No. | | | | | | | |
|---|---|---|---|---|---|---|---|---|
| | 1 | 2 | 3 | 4 | 5 | 6 | 7 | 8 |
| Wt.% Cu | 2.5 | — | 2.5 | 5 | — | 2.5 | 2.5 | — |
| Wt.% Ni | 2.5 | 2.5 | — | — | 5 | 1.5 | 1.5 | — |
| Wt.% Mo | 7.5 | 7.5 | 7.5 | 7.5 | 7.5 | 7.5 | 7.5 | 11.0 |
| Wt.% Th | — | — | — | — | — | 5.0 | — | — |
| Wt.% Zr | — | 5.0 | — | — | — | — | 5.0 | — |
| Activity | 1.5 | 1.6 | 1.4 | 1.2 | * | 1.2 | 1.1 | 1.0 |
| $C_6$ +selectivity | 6.2 | −3.2 | 2.6 | 2.7 | * | 3.5 | 2.5 | 0 |
| Wt.% methane | 1.26 | 8.6 | 1.8 | 1.2 | 37.0 | 2.13 | 2.62 | 2.0 |

* No meaningful results. Run terminated due to rapidly rising reaction temperature.

From table III it can be seen that catalysts of the present invention containing oxides of copper, nickel and molybdenum are vastly superior to those containing only copper and molybdenum or only nickel and molybdenum. This can be seen in the improved selectivity for $C_6$+ hydrocarbons without loss of activity and without excessive yield of methane.

While the reasons for superior results using catalysts of the present invention are not completely understood, it is believed that nickel promotes activity of the catalysts whereas the copper tends to inhibit sublimation of the molybdenum oxide and thereby preserve activity and selectivity of the catalyst. Unfortunately, the use of copper is also believed to accelerate conversion of gamma alumina to alpha alumina so that for long term use of the catalyst, especially through a number of regenerations, the addition of minor amounts of thorium or zirconium oxide is also desirable in order to inhibit the effect of the copper on transformation of the alumina. In any event, it is quite clear that the copper and nickel have a synergistic effect when used in conjunction with molybdenum on the gamma alumina base hydroforming catalyst.

While the invention has been described above in connection with certain preferred embodiments thereof, it will be understood by those skilled in the art that various changes and modifications may be made without departing from the spirit and scope of the invention as expressed in the appended claims.

I claim:

1. A catalyst comprising between about 0.5 and about 10.0 wt. percent copper oxide, between about 0.5 and about 5.0 wt. percent nickel oxide and between about 5 and about 15 wt. percent molybdenum oxide on between about 75 and about 95 wt. percent of a gamma alumina base based on total weight of catalyst.

2. A catalyst according to claim 1 which also includes between about 0.5 and about 5.0 wt. percent based on total catalyst of at least one oxide selected from the group consisting of thorium oxides and zirconium oxides.

3. A catalyst according to claim 2 which consists essentially of copper oxide, nickel oxide, molybdenum oxide and thorium oxide on a gamma alumina base.

4. A catalyst according to claim 2 which consists essentially of copper oxide, nickel oxide, molybdenum oxide and zirconium oxide on a gamma alumina base.

5. A hydroforming process which comprises subjecting a liquid hydrocarbon fraction boiling within the range of about 185° to about 450° F. to hydroforming conditions in the presence of hydrogen and a hydroforming catalyst comprising between about 0.5 and about 10.0 wt. percent copper oxide, between about 0.5 and about 5.0 wt. percent nickel oxide, and between about 5 and about 15 wt. percent molybdenum oxide on between about 75 and about 95 wt. percent of a gamma alumina base based on total weight of catalyst.

6. The process of claim 5 in which the hydroforming conditions include a temperature between about 700° and about 1,000° F., a pressure between about 100 and about 500 p.s.i.g., a space velocity between about 0.2 and about 2.0 w./hr./w., and in which hydrogen is present in amounts between about 500 and about 8,000 standard cubic feet of hydrogen per barrel of hydrocarbon feed.

7. The process of claim 6 in which the catalyst also includes between about 0.5 and about 5.0 wt. percent of at least one oxide selected from the group consisting of thorium oxides and zirconium oxides.

8. The process of claim 5 in which the catalyst consists essentially of a mixture of copper oxide, nickel oxide, molybdenum oxide, and thorium oxide on a gamma alumina base and which the metals are present in amounts between about 0.5 and about 10.0 wt. percent copper, between about 0.5 and about 5.0 wt. percent nickel, between about 0.5 and about 5.0 wt. percent thorium and about 5 and about 15 wt. percent molybdenum.

9. The process of claim 5 in which the catalyst consists essentially of a mixture of copper oxide, nickel oxide, molybdenum oxide, and zirconium oxide on a gamma alumina base and in which the metals are present in amounts about 0.5 and about 10.0 wt. percent copper, between about 0.5 and about 5.0 wt. percent nickel, between about 0.5 and about 5.0 wt. percent zirconium and about 5 and 15 wt. percent molybdenum.